INVENTOR.
Clarence Johnson
BY
Hoodling and Krost
attys.

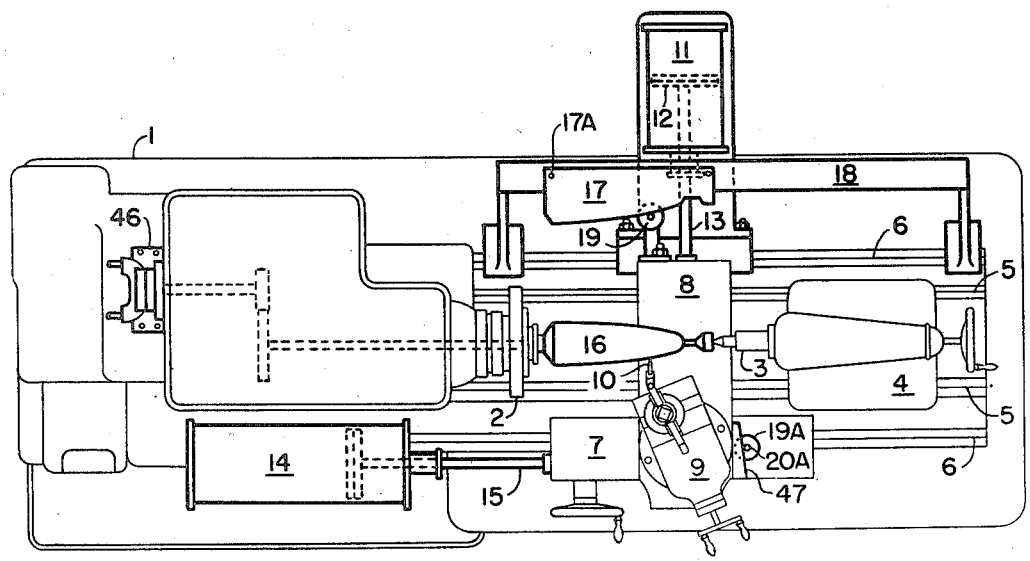

Patented July 5, 1949

2,475,326

UNITED STATES PATENT OFFICE 2,475,326

CONTROL SYSTEM

Clarence Johnson, South Euclid, Ohio, assignor to Bailey Meter Company, a corporation of Delaware Application March 2, 1944, Serial No. 524,707

5 Claims. (Cl. 82—14)

1

This invention relates to duplicators for controlling the operation of a material forming machine so that a work piece is formed to a contour or configuration determined by a template, pattern or cam.

One of the objects of my invention is to improve the sensitivity of contour control of the type described and to thereby increase the accuracy with which the work piece is formed.

A further object of my invention is to provide a contour control of materially simpler construction than those now available.

In accordance with my invention the template or cam for producing the desired configuration on the work piece is scanned by a tracer regulating a jet of fluid from a nozzle. Variations in the shape of the template cause corresponding changes in the fluid discharged from the nozzle which variations are then used to control the relative positioning of the tool and work piece.

Further, in accordance with my invention the changes in fluid pressure control the relative positioning of the tool and work piece through a hydraulic relay and servo-motor, to the end that ample power is available for accurately positioning the tool relative to the work piece, or vice versa. The relative rates of movement of the tool and work piece in two or more directions are simultaneously controlled so that the rate of cutting feed of the tool remains substantially constant regardless of changes in contour or profile of the template, pattern or cam.

This application constitutes a continuation-in-part of my copending applications Serial No. 412,017, filed September 23, 1941, now Patent No. 2,372,427, granted March 27, 1945, and Serial No. 384,375, filed March 20, 1941, now Patent No. 2,372,426, granted March 27, 1945.

Obviously a duplicator or contour control of the type forming the subject matter of my invention may be employed with material forming machines or machine tools of various types, such as milling machines, lathes, slotters, planers, die sinking machines and other machines in which the relative feed between the tool and work may be suitably controlled. By way of example I illustrate and will describe my invention as applied to metal working lathes. Further applications and modifications of my invention will be readily apparent.

In the drawings:

Fig. 1 is a plan view of an engine lathe illustrating the application of my invention thereto.

Fig. 2 is a diagrammatic illustration of the pneumatic and hydraulic control circuits employed in

Figures 4, 5, 6:
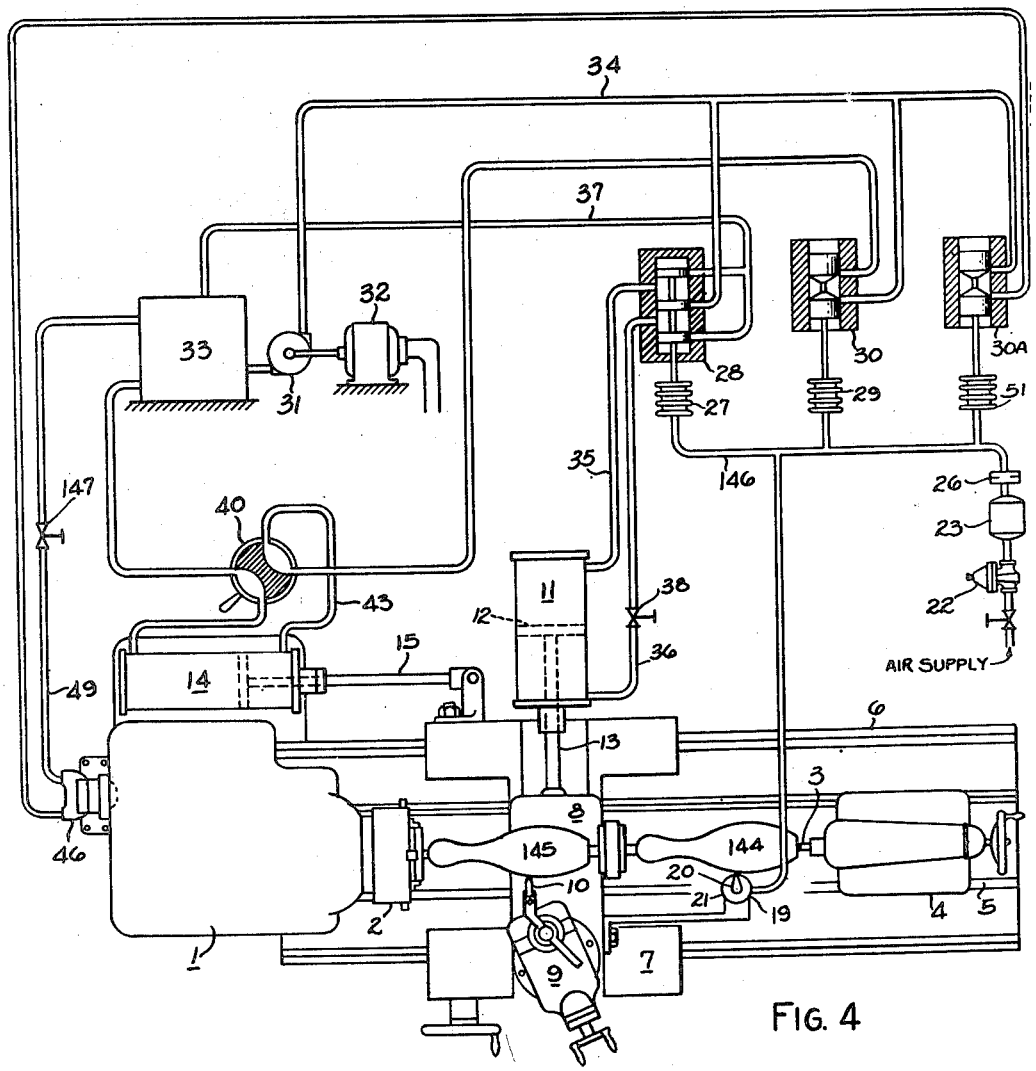

2 the embodiment of my invention shown in Fig. 1.

Fig. 3 is a transfer valve arrangement of Fig. 2.

Figure 4 is a plan view of a lathe embodying a further arrangement in accordance with my invention.

Figures 5 and 6 are sections of work pieces set forth as an example of cross sections formable by the lathe of Figure 4.

As is well understood by those familiar with the art, in some machine tools such as lathes, the tool is moved longitudinally and transversely of the work piece which, except for rotation about its center, remains stationary. In other machine tools, such as some types of milling machines, the work piece may be moved in two directions, while the tool, except for rotation about its axis, remains stationary. In some other types of milling machines, and usually in die sinking machines, the tool may be moved in one or more directions and the work piece may also be moved in one or more directions. In all instances it will be observed, however, that it is the relative movement between the tool and work piece that causes the work piece to be formed to a desired shape. As one specific embodiment I have chosen to illustrate and describe my invention incorporated in a lathe wherein the work piece, except for rotation about its center, remains stationary and the tool is moved transversely and longitudinally thereof. It will thus be evident that my invention is applicable to a wide variety of machine tools, and that when I speak of relative movement between the tool and work piece I include either an arrangement where the tool is stationary and the work piece is moved, or where the work piece is stationary and the tool is moved, or a combination of the two.

Referring now to Fig. 1, I show my invention applied to an engine lathe 1 having a head stock 2 adapted to be rotated by any suitable means. The carriage 4 is movable longitudinally along the bed of the lathe in suitable ways 5 and supports the tail stock 3. Also movable longitudinally along the bed of the lathe in suitable ways 6 is a carriage 7 upon which is mounted a cross-slide 8 movable on ways transversely of the bed of the lathe.

The cross-slide 8 is provided with an adjustable tool support 9 in which is secured a tool 10. Transverse movements of the tool 10 are produced through the agency of a hydraulic cylinder 11 having a piston 12 adapted to position the cross-slide 8 through the agency of a piston rod 13. Longitudinal movements of the tool 10, that is movements of the tool parallel to the bed of the lathe in a longitudinal direction, are produced by means of a hydraulic cylinder 14 having an operating piston rod 15.

Supported by the head stock 2 and the tail stock 3 is a work piece 16 which, for illustrative purposes, is shown as being formed to a parabolic shape by the tool 10. This particular shape has no significance, it being apparent as the description proceeds that by my invention the work piece may be formed automatically to any desired contour. The master template or cam 17 is rigidly held in parallelism to the work piece 16 upon any convenient extension 18 of the lathe bed. The profile of the master template 17 is the contour which it is desired to reproduce upon the work piece 16. In Fig. 1 the shape of the work piece 16 follows in general a parabolic function merely as an example. For contacting and following the profile of the master template 17 I provide a tracer assembly 19 rigidly mounted on and movable with the cross-slide 8. The tracer assembly 19 has a vertical extension 20 adapted to contact the front edge or profile of the master template 17. A body member or housing 21 is adjustably mounted to the cross-slide 8 and the tracer extension or arm 20 is carried with the body 21.

The tracer assembly 19 may be of any convenient design. Suffice it to say now that the tracer arm 20 continually scans the profile of the template 17 and controls the bleed to atmosphere of a substantially constant pressure supply of compressed air. The variable bleed or rate of flow of air to the atmosphere produces corresponding changes in back pressure or pressure of the air effective to cause a positioning of the piston rods 13 and 15 for transverse and longitudinal movements respectively of the tool 10.

In Fig. 2 I have shown diagrammatically the pneumatic and hydraulic circuits for controlling the servo-motors 11 and 14 by the tracer 19 in such manner that the motor 11 will position the cross-slide and consequently the tool 10 transversely of the lathe, or in other words toward or away from the work piece 16 as the tool is traveling longitudinally. The action is such that if the contacted edge of the master template 17 is a straight line parallel to the axis of the work piece 16, then the work piece 16 would be turned to cylindrical form. If the contacted edge of the template 17 is a straight line, but inclined relative to the axis of the work piece 16, then the work piece 16 will be shaped to a taper. The particular showing of Fig. 1 is in general a parabolic curve on the contacted edge of the template 17, and thus the form which is to be produced on the work piece 16.

Air under pressure from any convenient source is passed through a pressure regulator 22 and volume chamber 23 to a header 24, from which a branch 25 leads through an orifice 26 to the tracer assembly 19. As the discharge from the tracer 19 to the atmosphere varies, the pressure in the branch 25 between the orifice 26 and the tracer assembly 19 will vary, and such controlled air pressure, representative of changes in contour of the template 17, is effective upon a bellows 27 of a pilot valve assembly 28 and simultaneously upon a bellows 29 of a fluid resistance assembly 30.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. In the pipe 36 I show a hand adjustable valve 38 for variably throttling the flow of oil therethrough and thus controlling the basic rate of travel of the piston rod 13. Within any preselected range of speed of piston travel the relay of the assembly 28 not only controls the direction of piston travel but the speed within said range.

In connection with the hydraulic motor 14 and adjustable fluid resistance assembly 30 I provide switching valves 39 and 40 arranged to be moved together to either a "normal" or a "rapid traverse" position of operation of the hydraulic motor 14. The valves 39 and 40 are shown in Fig. 2 in the "normal" operating position. Oil under pressure from the pump 31 is forced through a pipe 41, the valve 40 and a pipe 43 to one end of the hydraulic motor 14. Oil from the other end of the motor passes through a pipe 42, the valve 40, the valve 39, the pipe 44, the adjustable fluid resistance 30, and the pipe 45 to the sump 33. The regulation of the variable resistance 30 determines the rate of flow of oil through the pipe 42, and consequently the rate of travel of the piston rod 15 toward the left in the drawing. Thus the rate of longitudinal travel of the tool 10 along the work piece 16 is controlled by the variable resistance 30 to passage of oil therethrough from the left-hand end of the motor 14.

In Fig. 3 I show the passage relation of the switching valves 39, 40 for a "rapid return" of the piston rod 15 from left to right of Fig. 2. That is for a rapid return of the tool 10 to the beginning of its working travel. Oil from the pump 31 passes directly through the pipe 41, the valve 40, and the pipe 42; while oil from the right-hand end of the motor 14 passes directly through the pipe 43, the valve 40, the valve 39, to the pipe 45 and sump 33. Thus on the rapid return of the piston rod 15 there is no throttling of its speed of travel by the variable resistance 30, and thus the tool is traversed to the right at maximum speed.

In general, the operation of the system illustrated in Figs. 1, 2 and 3 is as follows. The air pressure established within the pipe 25 is such that the bellows 27 and 29 (and the movable parts of the assemblies 28, 30 positioned thereby) provide a normal condition of operation. The pilot valve assembly 28 locks oil from the pipes 35, 36 so that the piston rod 13 is not moving and the tool 10 travels a cutting path parallel to the axis of the work piece 16. At the same time the variable fluid resistance 30 is in a position to provide a normal speed of travel of the piston rod 15 from right to left on the drawing, thus moving the tool 10 along the work at a uniform normal speed.

If the profile of the template 17 recedes from the axis of the work piece, or advances toward the axis of the work piece, the air pressure within the pipe 25 is correspondingly varied in proper direction to increase or decrease the air pressure within the bellows 27 and 29 and to cause a corresponding positioning of the movable elements of the pilot valve 28 and fluid resistance 30. Such movement causes the hydraulic motor 11 to position the tool toward or away from the axis of the work piece 16, and thus reproduce upon the work piece 16 the contour of the master template 17. At the same time any departure (in either direction) of the movable element of the variable resistance 30 from normal position will increase the resistance to oil passage therethrough and tend to slow up travel of the piston rod 15. Thus longitudinal travel of the tool 10 from right to left on the drawing will be at a speed slower than the normal speed depending upon the rate of travel of the tool 10 toward or away from the axis of the work piece 16. If, for example, the profile of the template 17 includes a shoulder at right angles to parallelism with the axis of the work piece 16, then there will be a complete stoppage of longitudinal travel of the tool 10 while the tool is advancing directly toward the axis of the work piece or is receding directly therefrom. Movement of the tracer arm 20 either toward or away from the contact edge of the template 17 from a neutral or normal position results in a decrease in speed of travel of the tool 10 in a longitudinal direction from its normal speed of travel and irrespective as to whether the tool is advancing toward the axis of the work piece or is receding from the axis.

After complete travel of the tool has been accomplished from right to left, then a rapid return of the tool to the right may be accomplished by moving the switching valves 39, 40 to the position shown in Fig. 3 wherein the connections to the cylinder 14 are reversed and the variable restriction 30 is made non-effective.

The system which I have just described in connection with Figs. 1, 2 and 3 is in general a two-element control wherein the lathe tool is positioned both transversely and longitudinally of the work piece. It will, of course, be seen that either element may be employed without necessarily employing the second element. For example, a lathe or similar material forming machine may have the tracer assembly 19 control only the cross feed of the tool or only the longitudinal speed of the tool, or the two combined as I have just described. It may, however, in certain instances be desirable to include a third element, namely, a control of the speed of rotation of the work piece 16, so that the linear cutting speed of the tool will remain constant regardless of the diameter of the work piece at which the tool is cutting. In other words, so that the speed of rotation of the work piece 16 will be different when the tool 10 is cutting at a larger diameter than it is when the tool is cutting at a smaller diameter. To illustrate such a possibility I have indicated on Fig. 1 an oil motor 46 for rotating the work 16 and under the control of a tracer assembly 19A which may be mounted on and longitudinally moved with the carriage 7. On the cross-slide 8 I locate a cam surface 47 movable with the tool 10 and relative to the tracer arm 20A of the tracer assembly 19A so that the tracer arm 20A is deflected by the cam 47 an amount indicative of the transverse position of the tool 10 relative to the axis of the work piece 16.

As explained in connection with Fig. 2, the tracer assembly 19A may control a variable fluid restriction 30A in the supply line 48 leading from the pump 31 to the motor 46, or in the discharge line 49 between the motor 46 and the sump 33, so that the speed of the motor 46 will depend entirely upon the position of the tracer arm 20A relative to the assembly 19A, and consequently will depend upon the transverse location of the cutting tool 10. The tracer assembly 19A is connected to the air header 24 through a branch 50 and applies a regulated air pressure to the bellows 51 of the fluid restriction assembly 30A, such pressure bearing a definite relation to the transverse position of the tool 10 relative the axis of the work piece 16.

In other words, as the diameter at which the tool 10 is cutting increases or decreases, the speed of rotation of the work piece 16 will correspondingly decrease or increase respectively. It will be apparent that this third element of control may be included on the lathe of Figs. 1, 2 and 3, either alone or in combination with either or both of the two elements of transverse and longitudinal tool travel.

In Fig. 4 I illustrate a further embodiment of my invention. Here for the first time I illustrate the control of three elements of lathe operation from a single tracer 19. In other words, not only the transverse and longitudinal positioning of the tool, but the speed of rotation of the work, are all simultaneously controlled by the tracer 19 scanning the pattern 144. In this embodiment the pattern 144 takes the general form of a bottle, as for example, a part for a bottle mold which may be of circular or rectangular cross-section and which form is to be reproduced in a work piece 145. Preferably the head stock 2 rotates the work piece 145, which in turn rotates the pattern 144. As the tracer 19 scans the pattern 144 the tool 10 shapes the work piece 145.

If the desired shape of the work piece 145 is such that any section taken therethrough at right angles to the axis of the lathe is a circle, then the pattern 144 may be, for example, a thin plate template and need not be rotated by and with the work piece. If, however, a section taken through the work piece 145 normal to the axis thereof is desirably of square or elliptical or other shape, then the pattern 144 may have the same shape and be rotated by or with the work piece 145.

A particular advantage of the arrangement shown, is that the tracer 19 may be used to control the speed of rotation of the work piece at the same time as controlling the transverse and longitudinal movement of the tool when scanning a pattern having other than circular cross-section. Thus a single tracer replaces the two tracers 19 and 19A of Fig. 1.

The tracer 19 controls the back pressure of air in a header 146 which feeds the bellows of the variable fluid resistances 30 and 30A as well as the fluid pilot valve 28. Thus the devices 28, 30 and 30A are simultaneously controlled by the tracer 19. As previously mentioned in connection with Figs. 1 and 2, the relay 28 controls the servo-motor 11, the fluid resistance 30 controls the servo-motor 14, and the fluid resistance 30A controls the servo-motor 46.

In Figs. 5 and 6 I show in section examples of pattern 144 which may be used in the arrangement of Fig. 4 to form the work piece 145 to other than circular cross-section. Fig. 5 shows an elliptical, and Fig. 6 a generally square, cross-section such as might be desired if the work piece 145 is to be shaped for use in bottle molding for example. Substantially any desired cross-section may be used in pattern 144. When other than circular cross-section, the pattern is rotated at the same speed as the work piece. As the cross-section deviates from circular it will probably be necessary to adjust the basic range of speed of rotation of the work and pattern and this is accomplished through the agency of hand valve 147. As the pattern is rotated the tracer follows its contour and the tool moves toward or away from the axis of the work piece, thus duplicating in the work piece the cross section of the pattern.

As the tracer moves (by servo-motor 14) axially of the pattern, the tool travels likewise longitudinally of the work and forms the work to the shape of the pattern. As the tracer approaches or recedes from the axis of the pattern the speed of rotation of the work and pattern is varied within the range chosen by valve 147.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What I claim as new, and desire to secure by Letters Patent of the United States, is:

1. In a lathe having a relatively movable tool and work piece, a first hydraulic motor means for relatively moving the tool and work piece transversely, a second hydraulic motor means for relatively moving the tool and work piece longitudinally, a third hydraulic motor means for rotating the work piece relative to the tool, a pattern having the desired shape of the work piece, a tracer mechanism including a fluid jet of normally constant pressure for traversing the pattern as the tool traverses the work, and a plurality of separate means all sensitive to variations in tracer jet pressure separately controlling said three motor means.

2. In a metal forming machine having a relatively movable tool and work piece, a first motor means for effecting relative movement of said tool and work piece in one path, a second motor means for effecting relative movement of said tool and work piece along another path, a third motor means for moving the work piece at a controllable speed, a pattern having the desired shape of the work piece, and a tracer scanning the pattern and simultaneously controlling the three motor means, said tracer including a port to atmosphere through which fluid is continuously passed, the rate of discharge of fluid controlled by said pattern.

3. In a lathe having a relatively movable tool and work piece, in combination, a pattern having the desired shape of the work piece and located axially in line with and rotated with said work piece, a tracer adapted to scan the pattern as the tool traverses the work, a first motor means positioning the tool toward or away from the work at regulable speed, a second motor means traveling the tool longitudinally of the work in one direction at regulable speed, and a third motor means adapted to simultaneously rotate the work piece and pattern at regulable speed, all three said motor means simultaneously controlled by said tracer.

4. In a lathe having a relatively movable tool and work piece, in combination, a pattern having the desired shape of the work piece and located axially in line with the work piece, a tracer adapted to scan the pattern as the tool traverses the work, a first motor means positioning the tool toward or away from the work at regulable speed according to the dictates of the pattern, a second motor means traveling the tool longitudinally of the work in one direction at regulable speed, and a third motor means adapted to rotate the work piece at regulable speed, all three said motor means simultaneously controlled by said tracer.

5. In a metal forming machine having a relatively movable tool and workpiece, first motor means for effecting relative movement of said tool and workpiece along a first path, second motor means for effecting relative movement of said tool and workpiece along a second path, third motor means for effecting relative rotational movement of said tool and workpiece, a pattern, and a tracer scanning the pattern and simultaneously controlling all three motor means, said tracer including a port to atmosphere through which fluid is continuously passed, the rate of discharge of fluid controlled by said pattern.

CLARENCE JOHNSON.

REFERENCES CITED

The following references are of record in the file of this patent:

UNITED STATES PATENTS

| Number | Name | Date |
|---|---|---|
| 62,977 | Stevens | Mar. 19, 1867 |
| 340,288 | Codling | Apr. 20, 1886 |
| 724,676 | Derrer | Apr. 7, 1903 |
| 1,028,036 | Lee | May 28, 1912 |
| 1,667,153 | Heymann | Apr. 24, 1928 |
| 1,754,046 | Rafferty | Apr. 8, 1930 |
| 2,016,931 | Richard | Oct. 8, 1935 |
| 2,025,748 | Howe | Dec. 31, 1935 |
| 2,068,890 | Sassen | Jan. 26, 1937 |
| 2,076,865 | Romaine | Apr. 13, 1937 |
| 2,150,032 | Herman | Mar. 7, 1939 |
| 2,259,472 | Johnson | Oct. 21, 1941 |
| 2,277,075 | Dahl | Mar. 24, 1942 |
| 2,331,817 | Turchan | Oct. 12, 1943 |
| 2,372,426 | Johnson | Mar. 27, 1945 |
| 2,422,681 | Johnson | June 24, 1947 |

FOREIGN PATENTS

| Number | Country | Date |
|---|---|---|
| 25,671/30 | Australia | Mar. 19, 1931 |